July 16, 1929. E. T. JOHNSSON 1,720,792
THERMOSTATIC TEMPERATURE REGULATOR
Filed March 30, 1925   2 Sheets-Sheet 1
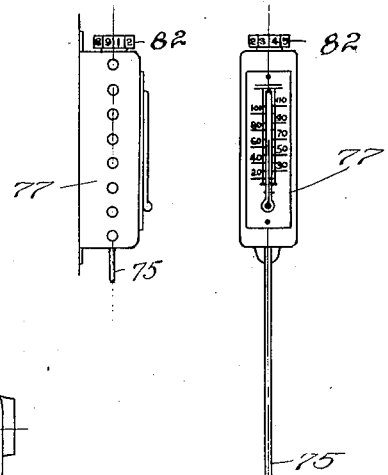
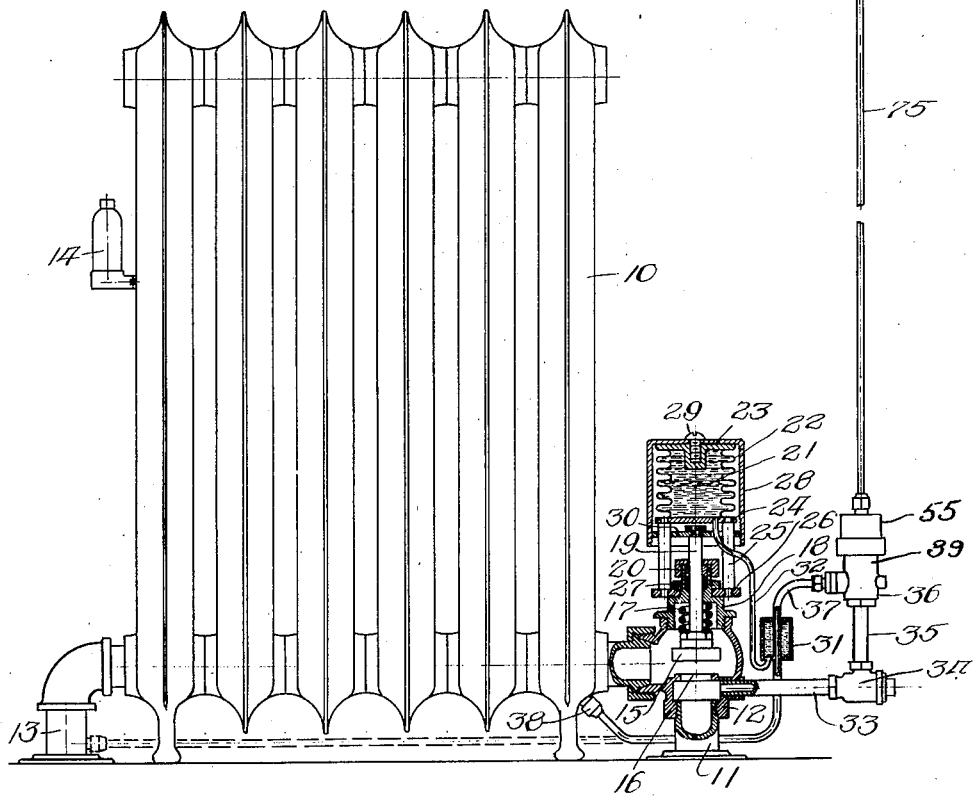
Inventor
Emil T. Johnsson,
By Glenn S. Noble
Atty.

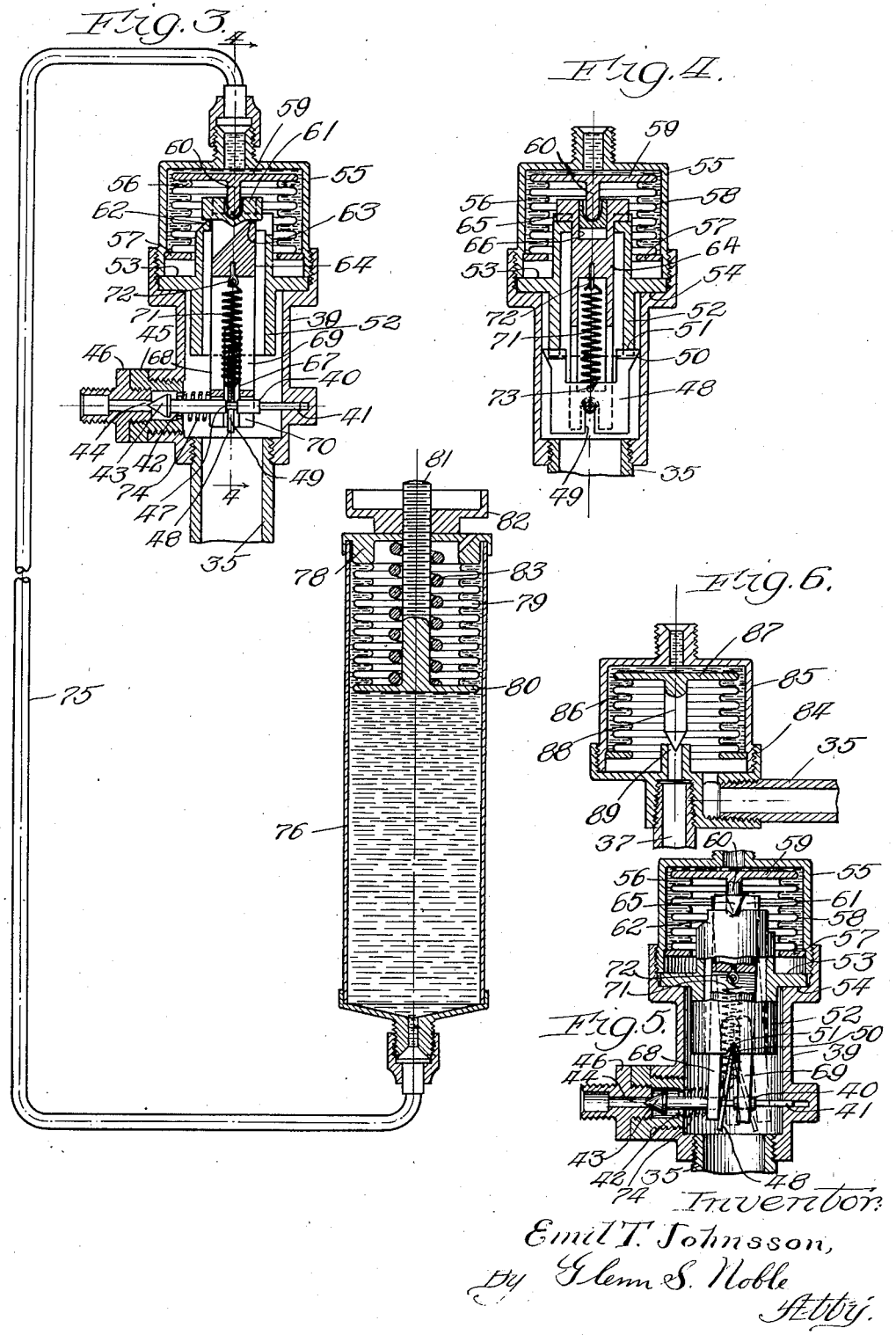

Patented July 16, 1929.

1,720,792

UNITED STATES PATENT OFFICE.

EMIL T. JOHNSSON, OF CHICAGO, ILLINOIS.

THERMOSTATIC TEMPERATURE REGULATOR.

Application filed March 30, 1925. Serial No. 19,418.

This invention relates to temperature controlling apparatus adapted for general purposes, as for controlling or regulating the temperature of chambers or bodies of material as for instance in connection with chemical processes where heat is furnished through the medium of a fluid, but is particularly intended for use in connection with heating plants employing vapor, steam, hot water or the like. A more specific application of my invention consists in utilizing the same for controlling the heating fluid passing to a radiator in order to regulate the temperature of a room.

The objects of this invention are to provide an improved automatic temperature regulating device; to provide a device of this character in which the controlling element, such as is influenced by the temperature of the room, will be particularly sensitive and readily adjusted; to provide means whereby a radiator valve may be opened or controlled by the heat furnished by the heating fluid; to provide an apparatus of this character which is readily applicable to different forms of heating systems; to provide means whereby the device for opening a radiator valve will not be affected to any appreciable extent by additional heat, after the valve is opened; and to provide such further novel features and advantages as will appear from the following description.

In the accompanying drawings illustrating this invention,

Figure 1 is a side view showing a radiator with my improved invention applied thereto, parts being shown in section to illustrate the interior construction;

Figure 2 is a side view of the wall thermostat and cover or casing;

Figure 3 is a sectional view of the wall thermostat and the controlling valve, the thermostat in this instance being shown below the valve instead of above, the same as in Figure 2;

Figure 4 is a sectional view of the controlling valve taken on the line 4—4 of Figure 3;

Figure 5 is a sectional view showing the controlling valve in closed position; and Figure 6 is a sectional view showing a modified form of the controlling valve.

The radiator 10 as shown in these drawings is provided with a supply pipe 11 having a valve 12 for controlling the supply of heating fluid. In some instances, the return may be through the supply pipe, but I have also shown a return pipe 13 as in a two pipe system, and the radiator may also be provided with the usual air valve 14. The valve disk or closing member 15 is urged or pressed toward the seat 16 by means of a spring 17 which is interposed between the valve disk and the valve cap or bonnet 18. The valve stem 19 passes up through the cap and is provided with the usual packing gland 20. The valve is further actuated or controlled through the medium of a suitable temperature responsive mechanism. While any suitable thermo responsive element may be used, such element as shown at 21 comprises a cylindrical member with corrugated or bellows like walls 22 and provided with a rigid head 23 and bottom 24. The bottom is rigidly secured to the valve 12 in any suitable manner as by means of posts 25 which are fastened thereto and are also fastened to a plate 26, which is held on the cap or bonnet 18 by means of a nut 27. The head 23 is fastened to a cylindrical housing 28 by means of a screw 29. The housing 28 is preferably provided with perforations to admit the air freely thereto. The housing 28 is threaded at the lower end to receive a threaded disk 30 which is securely fastened to the upper end of the valve stem 19. The disk is provided with holes for receiving the posts 25 so that the disk may move freely up and down. The thermo sensitive or expansion element 21, which for convenience will hereinafter be designated as the "expansion element", is connected to a closed chamber 31 by means of a pipe 32 which leads from the bottom 24 to the bottom of the chamber, the disk 30 being cut away or provided with a slot to admit the free movement of the disk with respect to the pipe or tube. The system formed by the expansion element, the connecting pipe and the chamber is substantially filled with a suitable liquid preferably having a boiling point below that of water, such as alcohol, and the system is entirely closed or hermetically sealed.

The fluid in the receptacle or chamber 31 is to be heated at predetermined times by the steam or heating fluid of the heating system. To this end a pipe 33 leads from the valve 12 below the seat thereof so that it is in communication with the pipe 11, and is connected with the strainer 34. The pipe 35 leads from the strainer to the controlling valve 36 and a pipe or tube 37 leads from this valve and passes through the chamber 31 and may be connected directly with the radiator, as shown at 38 in full lines in Figure 1. It is connected in this manner when used with a single pipe system or may be connected to the return pipe 13 as shown by dotted lines when a two pipe system is used.

The control valve 36 which controls the passage of the steam to the chamber 31 is actuated by novel thermostatic means which is controlled by the temperature of the room. This valve, as particularly shown in Figures 3 to 5 has a body 39 with a transversely arranged valve stem 40 which is carried in bearings 41 and 42. The conical valve or closing member 43 engages with a seat 44. The bearing 42 is, for convenience in construction, made in a sleeve 45 having holes through the inner end thereof to permit the passage of the steam, and the seat 44 is made in a plug 46 fitting in the sleeve 45 and connecting with the pipe or tube 37. The valve stem 40 has a groove 47 for receiving the lower end of a vibrating tongue or lever 48 which is provided with a slot 49 to fit over the reduced portion of the stem. This tongue is provided with knife edge fulcrums or pivots 50 which engage with recesses or bearings 51 in the lower end of a tube or cylinder 52 and the sides of the tongue are cut away below the fulcrum as shown in Figure 4 so that the lever is held from lateral movement by point contacts with the inner wall of the valve body 39. The cylinder 52 is supported by a flange 53 which rests on a shoulder 54 at the upper end of the valve body and is held in position by a casing 55 which is threaded to engage with the upper end of the valve body and which presses down on the flange. The casing 55 forms the outer or stationary portion of the pressure responsive member having a fluid receiving chamber 56. A ring 57 is secured to the inner lower portion of the casing 55 and is connected with an expansible inner wall 58 formed of corrugated metal or the like and provided at its upper end with a rigid plate or head 59, the chamber 56 being the space enclosed between these inner parts and the casing 55. The disk or head 59 has a pin or projection 60 which engages with a recess in the lever 61 which is pivoted on a knife edge fulcrum 62 at the upper end of the cylinder 52. The free end of the lever 61 bears on a knife edge fulcrum 63 on a vibrating arm or lever 64 which is pivoted on knife edge fulcrums 65, which rest in bearings or depressions in the upper end of the cylinder 52. The arm or lever 64 is provided with a transverse slot or opening 66 for receiving the lever 61 which fits freely therein, as shown in Figure 4. The arm or lever 64 is also provided with a slot 67 or bifurcated at its lower end to provide branches 68 and 69 for engagement with the opposite sides of the tongue or lever 48 which is to be swung thereby. The branches are also provided with slots 70 for receiving the valve stem 40 which passes freely therethrough. A tension spring 71 is secured at its upper end to an eye 72 in the center of the arm 64 which is cut away for receiving the spring, and the lower end of the spring is secured to the tongue or lever 48 as shown at 73, at a point below the fulcrums 50. A spring 74 is interposed between the lower end of the arm 64 and the sleeve 45 and tends to swing the arm, to move the controlling valve to open position.

The chamber 56 is connected by means of a tube or hollow wire 75 with a thermostatic or temperature responsive element 76 which for convenience will be designated as a "thermoscope". When the device is to be used for controlling the temperature of a room, this element will usually be mounted on a wall and enclosed in a housing 77, as shown in Figures 1 and 2 and the housing may if desired be provided with a thermometer as indicated. The thermoscope 76 comprises a chamber of cylindrical or other suitable form which is closed at the top by a cap or closure 78. An expansible inner wall or bellows like member 79 is soldered or otherwise tightly secured to the cap 78 and extends downwardly into the chamber, and is provided at its lower end with a disk or rigid bottom 80. A screw 81 is secured to the disk 80 and projects outwardly through the cap and is provided at its upper end with an adjusting nut 82. The inner expansible member is pressed downwardly or into the chamber by a spring 83 which abuts against the disk 80 and the cap or cover 78. The system comprised by the thermoscope chamber, the connecting tube 75, and the chamber 56 is filled with a suitable liquid, preferably one having a high coefficient of expansion and a high boiling point, such for instance as oil or the like. It will be readily seen that the pressure on the liquid in this system may be readily adjusted by turning the nut 82 which tends to increase or decrease the volume in the thermoscope, due to the expansion of the central member 79 and thereby increase or decrease the pressure on the fluid contained in the system.

The operation will be explained by first considering the control valve 36 and the radiator valve 12 as both being open, as shown in Figure 1. Steam at this time will pass from the supply pipe 11 to the radiator. As soon as the temperature in the room reaches a predetermined point, the liquid in the thermoscope will be expanded which will increase the pressure in the chamber 56 and press down on the disk 59. This causes the projection 60 to move the lever 61 downwardly, which in turn will swing the lever or arm 64 so that its lower end moves to the left as shown in Figure 3 against the tension of the spring 74. This causes the upper part of attachment 72 of the spring 71 to move to the left until the spring passes beyond the fulcrums 50 of the tongue 48. As soon as it moves past this position, the spring 67 acts as an overthrow tension member and snaps the tongue to the left, thereby quickly closing the control valve. It will be noted that the space between the branches 68 and 69 is sufficient to permit this closing movement before the tongue strikes the opposite branch 68. This will shut off the steam from the control valve through the pipe or tube 37 and chamber 31. As this chamber becomes cool, the liquid which has been driven through the tube 32 to the expansion element 21 will gradually return and thereby reduce the pressure in the expansion element, which permits the valve to close under the action of the spring 17. If the expansion element and connected parts are arranged so that a partial vacuum is formed therein, the closing pressure will be further augmented or increased by the pressure of the housing 28 through the disk 30 on the valve stem 19. Such auxiliary or additional pressure may be regulated by adjusting the housing 28 with respect to the disk 30 which may be readily done by loosening the screw 29 a sufficient amount to permit the turning of the housing to screw it up or down on the disk. As soon as the radiator valve is closed of course the temperature in the room may drop to a predetermined point. When this occurs, the liquid in the thermoscope will contract, thereby reducing the pressure in the chamber 56 and the arm 64 will gradually swing to the right, as shown in Figure 3, until the spring 67 again passes beyond the dead center when the valve will be quickly opened. The quick opening and closing of the valve is particularly desirable in order to prevent gradual leakage of steam through the parts, which might permit water to condense in the radiator. It will be noted that if the tension of the spring is not sufficient to swing the tongue 48 to open or close the valve, the opening or closing action will be made positive by the gradual movement of the lower end of the lever 64 until the corresponding branch presses against the tongue and thereby causes it to force the valve stem in a corresponding direction.

As soon as the control valve is opened, steam passes from the supply pipe 11 through the pipe 33 and is strained through the strainer 34 and then passes through the pipe 35 and control valve to the tube 37 which leads to the radiator or return pipe 13. As the liquid in the chamber 31 becomes heated, it will expand or vaporize and thereby increase the pressure in the expansion element 21 which will raise the housing 28 and open the radiator valve. The liquid in the expansion element and chamber 31 is preferably such that it will vaporize under the action of the steam in the pipe 37 and will drive all of the liquid from the chamber so that there will only be vapor remaining therein. The action of the steam on the vapor will have such slight tendency to increase the pressure that it will prevent any undue pressure in the expansion element 21 and the further heating of the chamber 31 by the steam will not cause any undue strain or otherwise affect the apparatus.

The modified form of controlling valve shown in Figure 6 is particularly for use in connection with double pipe or vacuum heating systems in which the gradual opening and closing of the radiator valve is not objectionable as the water of condensation may return to the boiler. In this instance, the pipe 35 leads to the valve body 84 which is provided with a casing 85 forming a part of a pressure responsive device similar to that heretofore described. In this instance, the fluid in the chamber 86 is adapted to press downwardly on the disk or diaphragm 87 and press the valve 88 against its seat 89 in the bottom of the valve body, and the steam will pass through the valve and out through the pipe 37. The operation with this form of control valve will be readily understood from the above description. The arrangement whereby the fluid pressure is carried direct from the thermoscope to the diaphragm of the control valve is of particular importance as it does away with the necessity of packing or glands for the valve stems and also does away with the necessity of mechanical parts or actuating devices. The presence of the steam in the control valve tends to keep the liquid in the pressure responsive element at comparatively uniform temperature, thereby permitting a more sensitive action by the thermoscope.

It will be noted that my improved apparatus may be made in various forms and sizes for different purposes or conditions, and therefore I do not wish to be limited to the exact arrangement herein shown and described except as specified in the following claims in which I claim:

1. A temperature controlling apparatus comprising a pipe for supplying heating fluid, a receptacle which is adapted to receive such fluid connected with said pipe, a valve in said pipe, a bellows for actuating said valve, a by-pass from the pipe around the valve, a thermostatically operated control valve for controlling said by-pass, a chamber adapted to be heated by the fluid passing through said by-pass, a tube connecting the chamber with the bellows, fluid in said chamber, tube and bellows, said chamber being separated from the bellows a sufficient distance so that a minimum amount of heat may be transmitted to the bellows, said bellows being arranged so that the valve will be normally closed but will be opened by the bellows when the fluid in said chamber becomes heated.

2. In a valve construction, the combination of a body having an inlet and an outlet, a valve for closing said outlet, a stem for said valve, a lever pivotally mounted in said body and having a bifurcated end with a slot for receiving said stem, a tongue positioned in said bifurcated end and pivoted adjacent thereto and engaging with a groove in the valve stem, an overthrow spring between the lever and the tongue, a spring engaging with the lever and tending to hold it in position to open the valve, a second lever pivotally engaging with the first named lever, a chamber secured to the valve body and having a movable diaphragm with a projection engaging with the last named lever, a thermoscope, and a tube leading from the thermoscope to said chamber.

3. The combination of a valve, an expansion element for actuating said valve, a plate secured to the valve and forming a portion of the expansion element, a cap secured to the expansion element, a disk having a threaded engagement with the cap and rigidly secured to the valve stem.

EMIL T. JOHNSSON.